United States Patent [19]

Rice et al.

[11] 4,405,894
[45] Sep. 20, 1983

[54] VOLTAGE CONTROL AND BALANCING CIRCUIT

[75] Inventors: Richard M. Rice, Afton; Stanley M. Hartman, Harrisonburg, both of Va.

[73] Assignee: Reynolds Metals Company, Richmond, Va.

[21] Appl. No.: 313,265

[22] Filed: Oct. 21, 1981

[51] Int. Cl.³ ............................................. H02J 3/00
[52] U.S. Cl. .................................... 323/340; 219/503; 307/15; 307/17; 307/32
[58] Field of Search .............. 219/243, 483, 484, 503; 307/12, 15, 17, 32, 36; 323/340

[56] References Cited

U.S. PATENT DOCUMENTS

| | | | |
|---|---|---|---|
| 400,486 | 4/1889 | Rice, Jr. .............................. | 307/15 |
| 1,422,653 | 4/1922 | Berry . | |
| 2,197,254 | 4/1940 | Hunter . | |
| 2,201,642 | 5/1940 | Baver . | |
| 2,465,137 | 3/1949 | Van Nordstrand ............ | 219/503 X |
| 2,961,031 | 11/1960 | Fener . | |
| 3,239,749 | 3/1966 | Oriez . | |
| 3,245,294 | 4/1966 | Butter et al. . | |
| 3,254,295 | 5/1966 | Vargo et al. . | |
| 3,275,788 | 9/1966 | Ferguson ......................... | 307/12 X |
| 3,445,753 | 5/1969 | Maxwell . | |
| 3,498,023 | 3/1970 | Reid et al. . | |
| 3,627,983 | 12/1971 | Pickering . | |

Primary Examiner—William M. Shoop

[57] ABSTRACT

A circuit is described for controlling voltage input to a pair of resistances. A main transformer and variable auto transformer are wired in cascade between the voltage supply and the resistances. The resistances are wired in series to the output of the variable auto transformer, with the null point between the resistances being connected to the variable tap of the auto transformer.

5 Claims, 1 Drawing Figure

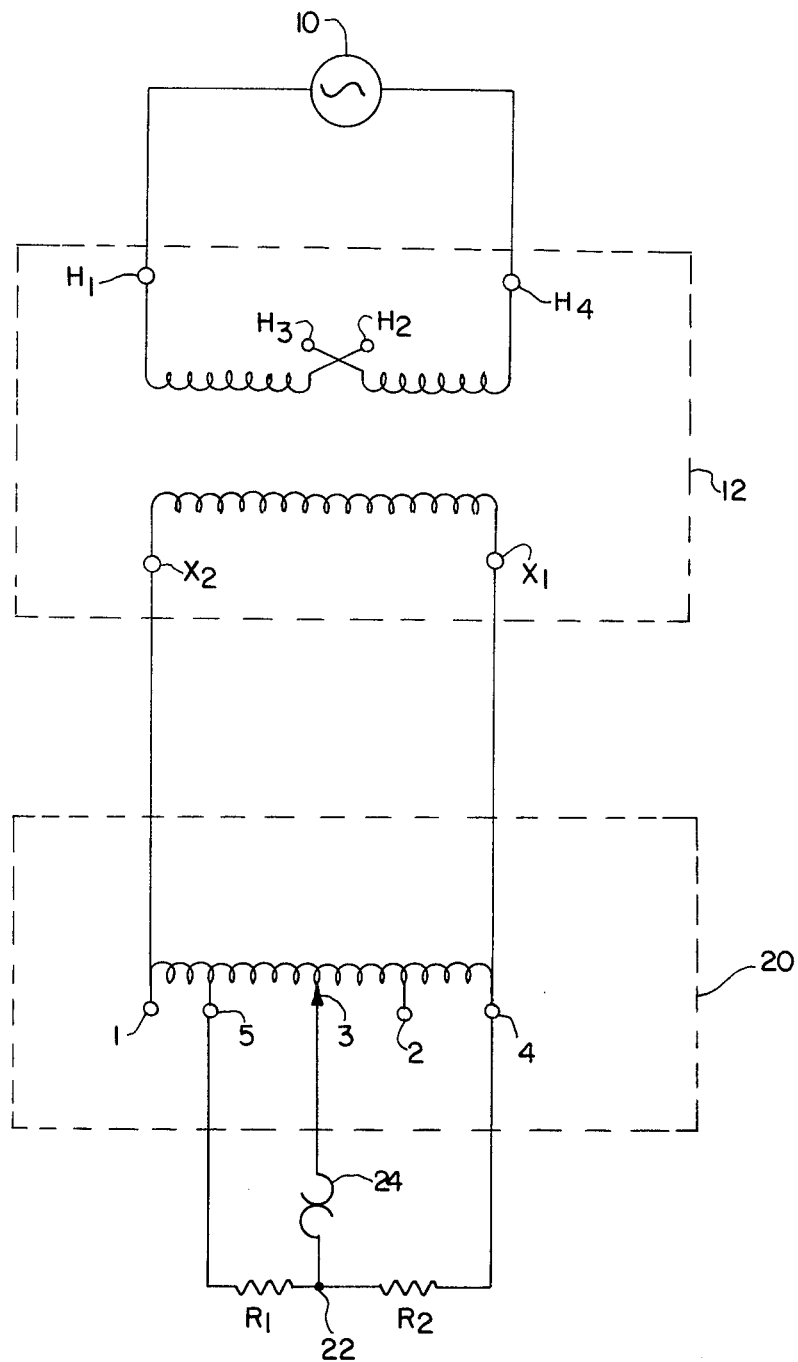

VOLTAGE CONTROL AND BALANCING CIRCUIT

BACKGROUND OF THE INVENTION

Wire sealers are commonly employed to simultaneously cut and seal plastics films in packaging. In one widely employed system, a center folded film uses its fold line as one side edge seal. The film, with the material being packaged positioned therein, is sealed along its other side edge and back edge simultaneously by use of an L-sealer, having two wires oriented 90° to one another. The seal forming the back edge of the package, when cut, also forms the front edge seal for the next succeeding package.

The sealing mechanism for each arm of an L-sealer comprises a wire or ribbon of a high resistivity metal, such as Nichrome ®, Chromel ®, Tophet ® and the like, and a back-up pad against which the film and wire are held. Sealing occurs as a pulse of electricity is sent through the wire when held against the back-up pad.

Since most packages are not square, L-sealers typically have wires of unequal length. For example, one commonly employed sealer, a model S-4C, manufactured by Shanklin Corporation, has arms of 35.375 inches (89.853 centimeters) and 25.125 inches (63.818 centimeters). If the same voltage were applied to these unequal length wires, the shorter wire would heat up much faster and attain a much higher temperature than the longer wire, due to its lesser total resistance. By the time the longer wire had reached an acceptable sealing temperature, the shorter wire would be at an excessively high temperature resulting in one or more of a scorched back-up pad, vaporization of the plastics film and resulting smoke and build-up on the back-up pad and wire and/or reduced wire life.

Two methods are currently employed to compensate for the difference in length of the two wires in an L-sealer. In one method, the voltage supplied to each wire is essentially proportional to its length. To accomplish this result, the wires are connected to separate windings of a multiwound transformer, with each winding of the transformer being approximately proportional to the length of the wire it supplies.

In another method, a single voltage supply is used, and the wires are connected in series to the voltage source. This results in an identical current flow through the two wires.

If ideal conditions were obtainable, either of these two methods would result in the wires heating at similar rates and reaching similar temperatures. However, ideal conditions are not real conditions. In actual practice, the two windings of the multiwound transformer may not exactly match the wire length proportion. The heat sink characteristics of the back-up pads for the two wires may not be equal. The two wires may have slightly different diameters, metallurgical state or other condition causing their resistance per unit length to be different. If one or more of these common conditions are present, loss of precision heating control results.

On the other hand, there are times when it is desirable to purposely slightly unbalance the behavior of the two wires in a controlled manner. For example, when sealing thick packages, wrinkles along the back seal might require additional heat to produce a satisfactory seal. Or, if the film has unequal shrink properties in its machine and cross directions, different sealing temperatures may be desirable.

It is desirable, therefore, to more accurately and individually control the supply of electrical power to the wires, enabling compensation for uneven conditions and permitting precise control of desired unbalance.

THE PRESENT INVENTION

By means of the present invention these desired results are obtained. The present invention concerns an electrical circuit for independent control of the input to a pair of heating elements or other resistances from a voltage source comprising a main step down or step up transformer and a voltage dividing and minor step down or up variable auto transformer wired in a series or cascade fashion between the voltage supply and the resistances. The main transformer provides a choice of major step down or step up voltages from the supplied voltages. The variable auto transformer acts as a minor step down or step up transformer, and as a voltage divider for the resistances. This circuit layout results in an ability to closely control the voltages supplied to each resistance, permitting balancing and/or controlled inbalance between the two elements. When used in an L-sealer, improved sealing characteristics and reduced smoke and build-up may be obtained.

BRIEF DESCRIPTION OF THE DRAWING

The invention will be more fully described with reference to the FIGURE, which is a schematic circuit diagram illustrating the circuit of the present invention.

DETAILED DESCRIPTION OF THE PREFERRED EMBODIMENT

Turning now to the FIGURE, the circuit comprising the present invention is illustrated. A pair of resistances, $R_1$ and $R_2$, which are preferably a pair of high resistivity wires on an L-sealer, but which, of course, could be any two resistances to be individually controlled, are to be supplied electrical power from an alternating current voltage source 10. The voltage source 10 typically provides either about 230 volts or 460 volts, but, of course, could provide other voltages.

The voltage is supplied first through a main step down or step up transformer 12. This transformer 12 has high voltage taps $H_1$, $H_2$, $H_3$ and $H_4$, and low voltage taps $X_1$ and $X_2$. Depending upon the wiring scheme chosen for input and output taps and for jumpers between taps, which wiring schemes are widely known to those skilled in the art, and thus need not be described at length, this transformer may step down the voltage supplied by voltage source 10 in a transformation ratio of, for example, 5/1, 4/1, 3/1, 2/1, 3/2, 5/4, 4/3 or 1/1, and step up by the inverse of these ratios. Again, the wiring schemes for this transformer 12 are standard. Such transformers are produced, for example, as a Model 9T55Y53G8, produced by General Electric; as a Model 636-1221, produced by Jefferson Electric; and as a Model 10942-H48, produced by Cutler-Hammer.

The FIGURE illustrates exiting voltage from taps $X_1$ and $X_2$; however, this need not be the case. The stepped down or stepped up voltage exiting transformer 12 at two of taps $H_1$, $H_2$, $H_3$, $H_4$, $X_1$ or $X_2$ next enters a variable auto transformer 20. As illustrated, the auto transformer 20 has main taps 1, 2, 4 and 5. Other variable auto transformers may include more or less taps. Depending on the taps chosen for input to the auto transformer 20 and the taps chosen for output from the auto transformer 20, numerous transformation ratios are also possible at this point. Thus, for example, typical step down transformation ratios of about 25/17, 21/17, 25/21, 25/4, 21/4, 17/4 or 1/1 and step up transformation ratios of the inverses thereof may be obtained when four taps, as illustrated, are employed. The number of ratios may increase or decrease, depending on the number of taps on a given transformer. Similarly, the ratios of a given transformer will vary according to the positioning of the taps on that transformer. A typical auto transformer which may be successfully employed in practicing the present invention is a Model 226U, produced by Superior Electric.

The output from the auto transformer 20 is supplied to the pair of resistances $R_1$ and $R_2$, which are wired in series. The null between the two resistances $R_1$ and $R_2$ is connected to a variable tap 3 of auto transformer 20.

In operation, the total wire length of $R_1$ plus $R_2$, in inches, is measured. This result is multiplied by an experienced-derived chosen voltage per inch factor, to obtain a desired power level. For example, the voltage per inch of film sealing wires may range between about 1.1 and 1.7 volts per inch, based upon the desired heating speeds and specific wire resistance. The product is then divided into the supply voltage to obtain the desired total transformation ratio. Once this total ratio is obtained, the main transformer and auto transformer are wired to produce this desired input and output scheme. The total transformation of the transformers is the product of their individual transformation ratios. Thus, the two ratios are selected such that their product approximately equals the desired total transformation ratio.

For example, given a voltage input of 220 volts and a desired voltage input to the resistances of about 84.5 volts, the total transformation desired is a step down of 2.60/1. To obtain this result, the main transformer 12 is wired to produce a 3/1 step down transformation and the auto transformer is wired to produce a 21/25 step up transformation, resulting in a total 2.52/1 transformation, or 87.3 volts input to the resistances $R_1$ and $R_2$.

At this point, the ability to fine tune the system becomes important. If the resulting 87.3 volts were equally distributed between the two resistances $R_1$ and $R_2$, the shorter wire would overheat. Variable tap 3 is adjusted to divide the voltage between the two resistances in the same ratio as the ratio of their lengths, if an equal power level per unit length is desired. For example, if $R_1$ is 25 inches (63.5 centimeters) and $R_2$ is 35 inches (88.9 centimeters), tap 3 is adjusted to supply 25/60 of the total voltage to $R_1$ and 35/60 of the total voltage to $R_2$. This is accomplished in the circuit by the positioning of variable tap 3 between the selected input taps. Thus, in the above example, 36.4 volts would be supplied to $R_1$ and 50.9 volts would be supplied to $R_2$. This gives equal current flows in the two loops.

As previously mentioned, a controlled inbalance may be desired. Thus, to provide improved sealing of certain size packages or types of film, the ratio of $R_1$ to $R_2$ length may be slightly modified by a factor to account for the package or film. This is done by slight readjustment of tap 3 from the $R_1/R_2$ set point by the operator during the sealing operation. The operator need not know the ultimate $R_1/R_2$ modified ratio, but looks at the seal produced, and, by his experience, notes a need for higher or lower temperature at one of the wires and so adjusts the auto transformer.

One property of this circuit is the fact that a low current flows through variable tap 3 of auto transformer 20. This tap 3, which is typically a carbon brush, would readily burn out if excessive current was applied thereto. By careful selection of the transformation ratios of the transformers 12 and 20, the adjustments necessary for proper sealing will normally result in current levels of about 0 to 3 amps at this tap 3. To assure that excessive current never reaches tap 3, a circuit breaker 24 may be interposed between null point 22 and tap 3.

It should be noted that two or more transformers 12 may be connected in series or cascade between voltage source 10 and variable auto transformer 20, if desired. This may provide added flexibility in obtaining a total transformation ratio more closely approximating the desired transformation ratio, as determined above. On the other hand, if a 1/1 transformation ratio for main transformer 12 is desired, the variable auto transformer 20 may be connected directly to the voltage source 10.

From the foregoing, it is clear that the present invention provides a circuit for voltage control which permits fine division of voltage between resistances and which includes a minimum number of components.

While the invention has been described with reference to certain specific embodiments thereof, it is not intended to be so limited thereby, except as set forth in the following claims.

I claim:

1. A circuit for controlling an alternating current voltage supply to a pair of resistances comprising a main transformer, said main transformer having a plurality of taps, a pair of which may be connected as an input from said alternating current voltage supply and another pair of which may be selected to thereby provide a plurality of fixed step down or step up transformation ratio outputs, and a variable auto transformer having a plurality of taps, a pair of which are connected as an input thereof to said output of said main transformer and another pair of which may be selected to thereby provide a plurality of fixed step down or step up transformation ratio outputs, said resistances being connected in series to said output of said variable auto transformer and having a null point between said resistances connected to a variable output tap of said variable auto transformer, whereby a selected transformation ratio provided by said main transformer and said variable auto transformer may be balanced by said variable output tap between said resistances.

2. The circuit of claim 1 wherein said resistances are heated wires.

3. The circuit of claim 2 wherein said heated wires are formed from a material selected from the group consisting of Nichrome, Tophet and Chromel.

4. The circuit of claim 1 wherein at least one additional main transformer, having a plurality of taps, a pair of which may be selected as an input from said main transformer and another pair of which may be selected to thereby provide a plurality of fixed step down or step up transformation ratio outputs, is connected between said main transformer and said variable auto transformer.

5. The circuit of claim 1 wherein a circuit breaker is interposed between said null point and said variable output tap.

* * * * *